(12) United States Patent
Kitamura

(10) Patent No.: US 7,032,069 B2
(45) Date of Patent: Apr. 18, 2006

(54) RAID APPARATUS AND ACCESS CONTROL METHOD THEREFOR WHICH BALANCES THE USE OF THE DISK UNITS

(75) Inventor: Yoshio Kitamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 10/619,597

(22) Filed: Jul. 16, 2003

(65) Prior Publication Data

US 2004/0015658 A1 Jan. 22, 2004

Related U.S. Application Data

(63) Continuation of application No. 08/932,427, filed on Sep. 17, 1997.

(30) Foreign Application Priority Data

Jan. 14, 1997 (JP) .................................. 9-004427

(51) Int. Cl.
*G06F 12/00* (2006.01)
*G06F 11/00* (2006.01)

(52) U.S. Cl. ........................... 711/114; 711/156; 714/6

(58) Field of Classification Search ................ 711/114, 711/147, 148, 173; 714/6, 7
See application file for complete search history.

(56) References Cited

U.S. PATENT DOCUMENTS

| 5,375,217 A | 12/1994 | Jibbe et al. |
| 5,408,634 A | 4/1995 | Joho |
| 5,537,567 A | 7/1996 | Galbraith et al. |
| 5,542,064 A | 7/1996 | Tanaka et al. |
| 5,568,629 A | 10/1996 | Gentry et al. |
| 5,636,356 A | 6/1997 | Kakuta et al. |
| 5,680,574 A | 10/1997 | Yamamoto et al. |
| 5,708,668 A | 1/1998 | Styczinski |
| 5,768,623 A * | 6/1998 | Judd et al. .................... 710/37 |

(Continued)

FOREIGN PATENT DOCUMENTS

EP 0 485 110 5/1992

(Continued)

OTHER PUBLICATIONS

Patent Abstracts of Japan, Kitajima Hiroyuki, "Method and Device for Controlling Storage Device", Publication Date May 11, 1991, Publication No. 03246713, Japanese Application No. 02042452, Feb. 26, 1980.

(Continued)

*Primary Examiner*—Gary Portka
(74) *Attorney, Agent, or Firm*—Staas & Halsey LLP

(57) ABSTRACT

A RAID apparatus and an access control method thereof includes same logical volumes allocated to a plurality of physical disk units. The RAID apparatus includes a plurality of physical disk units storing same logical volumes, and a disk controller accesses a particular logical volume by accessing any physical disk unit which stores a the particular logical volume. The disk controller includes a memory storing the number of operations requested of each physical disk unit, for each physical disk unit, and a control circuit accessing one of the plurality of physical disk units which stores the particular logical volume, in accordance with the number of operations. Since a physical disk unit is selected in accordance with the numbers of operations of the individual physical disk units, balanced access to the physical disk units is accomplished.

2 Claims, 8 Drawing Sheets

U.S. PATENT DOCUMENTS

| | | |
|---|---|---|
| 5,778,426 A | 7/1998 | DeKoning et al. |
| 5,809,516 A | 9/1998 | Ukai et al. |
| 5,819,310 A | 10/1998 | Vishlitzky et al. |
| 5,859,965 A | 1/1999 | Gittins et al. |
| 5,872,906 A * | 2/1999 | Morita et al. ............... 714/6 |
| 5,915,095 A | 6/1999 | Miskowiec |

FOREIGN PATENT DOCUMENTS

| | | |
|---|---|---|
| JP | 60-205641 | 10/1985 |
| JP | 3-253933 | 11/1991 |
| JP | 6187101 | 7/1994 |

OTHER PUBLICATIONS

English Translation of Japanese Patent Office Action for Patent Application No. Heisei 9 nen 004427, issued May 30, 2002.

*The RAIDBook, A Source Book for RAID Technology*, Edition 1-1, published by the RAID Advisory Board, St. Peter, MN, Nov. 18, 1993.

Yuji Ogawa et al., "F6401A Magnetic Disk Array Unit", Fujitsu Science Technology Journal, 31, 1, pp. 18-28 (Jun. 1995).

Hitoshi Matsushima et al., "F1710A File Control Unit and F6493 Array Disk Subsystem", Fujitsu Science Technology Journal, 31, 1, pp. 29-35 (Jun. 1995).

U.S. Appl. No. 08/932,427, filed Sep. 17, 1997, Kitamura.

Communication including Search Report from the European Patent Office mailed Mar. 18, 2004 for the corresponding European Application.

\* cited by examiner

FIG. 4

| Status | Number of Loads | Connected DA Number 1 | ... | Connected DA Number 2 |
|---|---|---|---|---|
| Status | Number of Loads | Connected DA Number 1 | | Connected DA Number 2 |

DM 0
⋮
DM 255

22-2

RAID APPARATUS AND ACCESS CONTROL METHOD THEREFOR WHICH BALANCES THE USE OF THE DISK UNITS

This application is a continuation of application No. 08/932,427, filed Sep. 17, 1997, now pending.

BACKGROUND OF THE INVENTION

1. Field of the Invention

The present invention relates to a RAID (Redundant Arrays of Inexpensive Disks) apparatus which allocates a plurality of same logical volumes to a plurality of physical disk units and an access control method therefor, and, more particularly, to a RAID apparatus which prevents access requests and an access unbalanced control method therefor.

2. Description of the Related Art

Disk storage systems such as a magnetic disk system are used as an external storage system in a computer system. A host computer accesses such a disk storage system with a logical volume name that an OS (Operating System) recognizes. Logical volumes are allocated in a disk storage system.

If one set of individual logical volumes is allocated in such a disk storage system, when a physical disk unit where some of the logical volumes are located fails, those logical volumes cannot be used any more.

To prevent this problem, a RAID apparatus has been proposed. A RAID apparatus has a plurality of same logical volumes allocated on different disk units. When one disk unit fails, another disk unit where the same logical volume of interest is allocated is used. This system can prevent the occurrence of an event that any logical volume becomes unusable due to failure of the associated disk unit.

FIG. 8 is an explanatory diagram of prior art.

As shown in FIG. 8, a RAID apparatus comprises a plurality of magnetic disk units 91-1 to 91-4 and a disk controller 90 which controls those disk units. FIG. 8 shows the RAID apparatus with a mirror structure which includes four magnetic disk units 91-1 to 91-4.

A logical volume LM0 is allocated on the magnetic disk unit 91-1. The same logical volume LM0 as located on the magnetic-disk unit 91-1 is allocated on the magnetic disk unit 91-2. A logical volume LM1 is allocated on the magnetic disk unit 91-3. The same logical volume LM1 as located on the magnetic disk unit 91-3 is allocated on the magnetic disk unit 91-4.

Even if the magnetic disk unit 91-1 fails, the logical volume LM0 can be accessed by using the magnetic disk unit 91-2. Even if the magnetic disk unit 91-3 fails, likewise, the logical volume LM1 can be accessed by using the magnetic disk unit 91-4.

When a plurality of logical volumes are set in one physical disk unit, however, a high-rank apparatus, such as a host computer, issues two or more access requests to the same physical volume. In such a case, since one physical disk unit cannot execute two operations at a time, the prior art scheme suffers the inherent problem that some access requests should wait.

The operation of the magnetic disk units takes a relatively longer time than the operation time of a high-rank apparatus. If some high-rank apparatus frequently issues an access request to the same logical volume, therefore, the number of access request that should wait increases. This increases the time from the issuance of an access request to the end of the requested operation, thus reducing the system access speed.

SUMMARY OF THE INVENTION

Accordingly, it is an object of the present invention to provide a RAID apparatus and an access control method therefor, which prevent unbalanced access requests to a physical disk unit.

It is another object of this invention to provide a RAID apparatus and an access control method therefor, which auto-adjusts loads between physical disk units.

It is a further object of this invention to provide a RAID apparatus and an access control method therefor, which prevents the degradation of the performance caused by unevenly applied loads on physical disk units.

To achieve those objects, a RAID apparatus according to this invention comprises a plurality of physical disk units for forming same logical volumes, and a disk controller for accessing any physical disk unit which forms a designated logical volume to thereby access the designated logical volume.

This disk controller has a memory for storing the number of operations, requested to each physical disk unit, for each physical disk unit, and control means for accessing one of the plurality of physical disk units which form the designed logical volume, in accordance with the number of operations.

An access control method according to this invention comprises the steps of determining a plurality of physical disk units which form a designed logical volume; and selecting one of the determined physical disk units in accordance with the number of operations requested to the physical disk units.

According to this invention, the number of operations requested to each physical disk unit is stored for each physical disk unit. The physical disk unit which should execute an access request is selected in accordance with the number of the operations.

The number of the operations requested to each physical disk unit is the number of the operations of each physical disk unit which are currently being performed and are standing by for execution. According to this invention, therefore, the number of actual loads on the physical disk units are always measured. The number of the operations (the number of loads) of each of a plurality of physical disk units which hold the same logical volume is determined and a target physical disk unit is selected in accordance with the number of the operations.

In other words, access control is carried out in such a way that the numbers of loads on individual physical disk units which hold the same logical volume become even. This scheme can prevent unbalanced access requests to the physical disk units, thus improving the access speed.

In this respect, one may consider to alternately select physical disk units every given time. Since access requests from a high-rank apparatus do not come evenly, however, this scheme has a difficulty in performing access control in such a manner that the numbers of loads on individual physical disk units which form the same logical volume become even.

According to this invention, since the number of actual loads on the physical disk units are always measured, access control can be executed in such a way that the numbers of loads on a plurality of physical disk units become even.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 4 is an explanatory diagram of a DM management table according to the embodiment in FIG. 2;

DETAILED DESCRIPTION OF THE PREFERRED EMBODIMENTS

Figure 1:
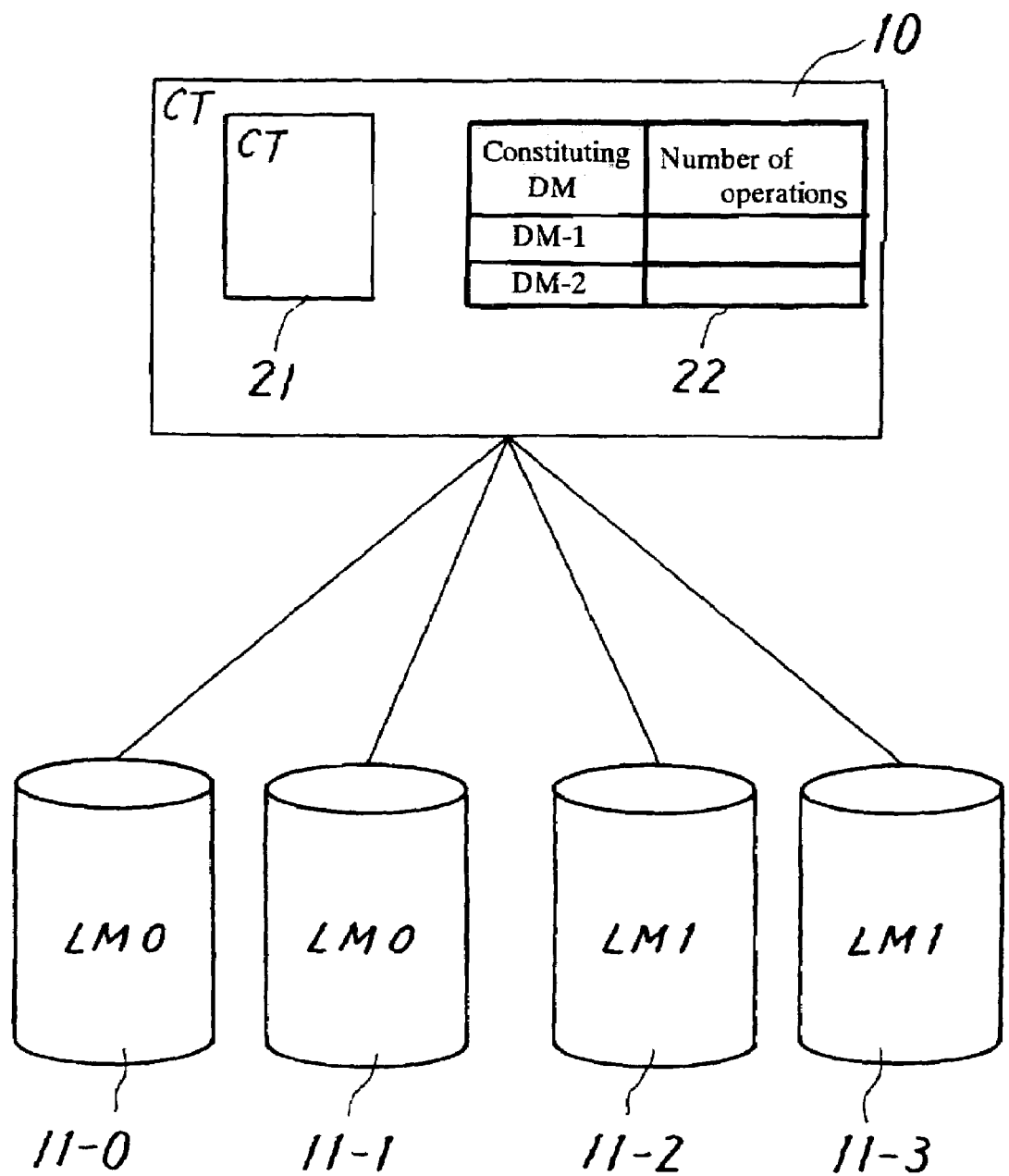
FIG. 1 is a principle diagram of this invention.

FIG. 1 presents a principle diagram of this invention.

As shown in FIG. 1, physical disk units 11-0 and 11-1 form a same logical volume LM0. Physical disk units 11-2 and 11-3 form a same logical volume LM1. A disk controller 10 accesses a physical disk unit on which a designated logical volume is allocated to thereby access the designated logical volume.

This disk controller 10 has a memory 22 for storing the number of operations, requested to each physical disk unit, for each physical disk unit. The disk controller 10 further includes a control circuit 21 for accessing one of a plurality of physical disk units which form the designated logical volume, in accordance with the number of the operations.

Figure 2:
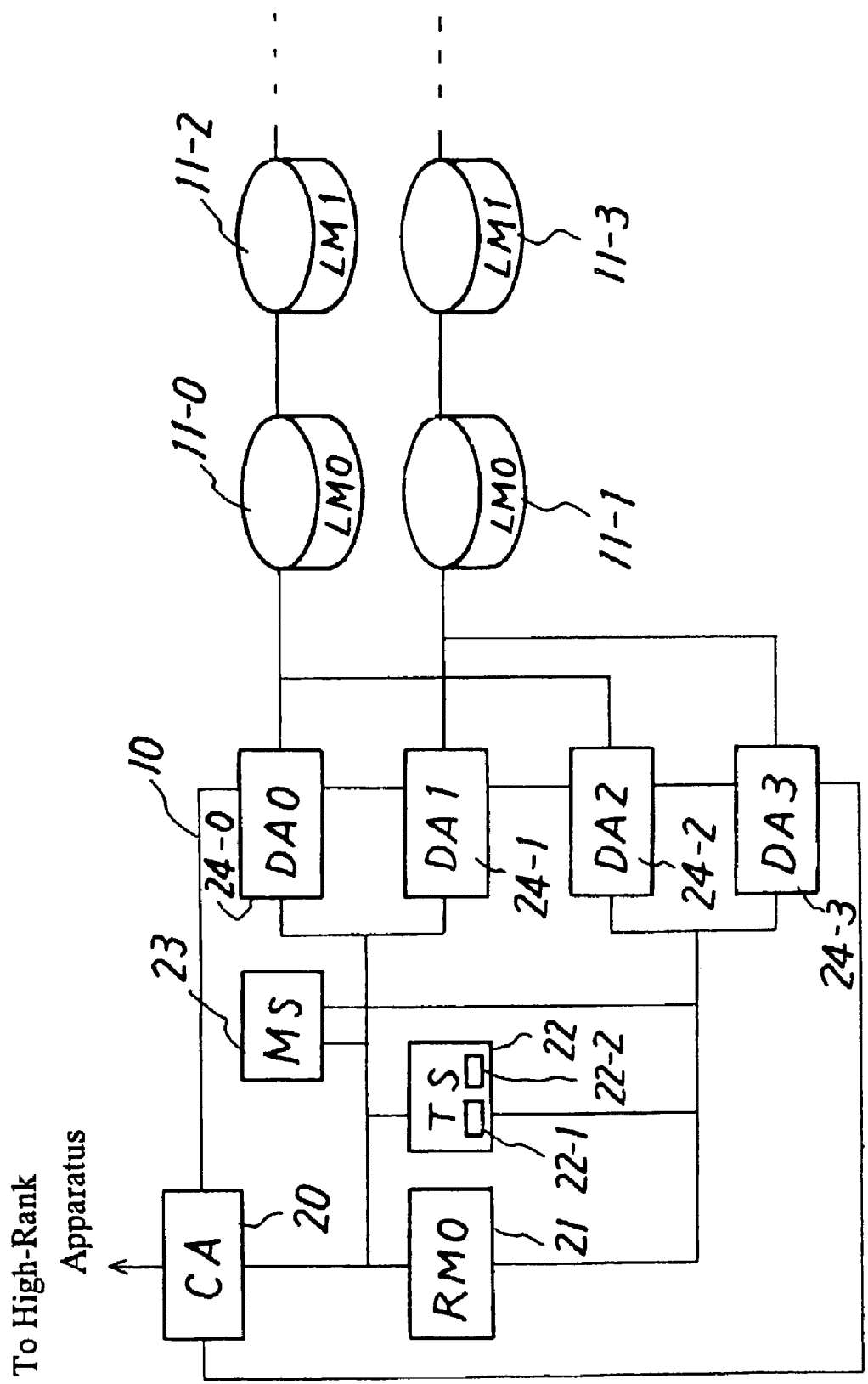
FIG. 2 is a structural diagram of one embodiment of this invention.
Figure 3:
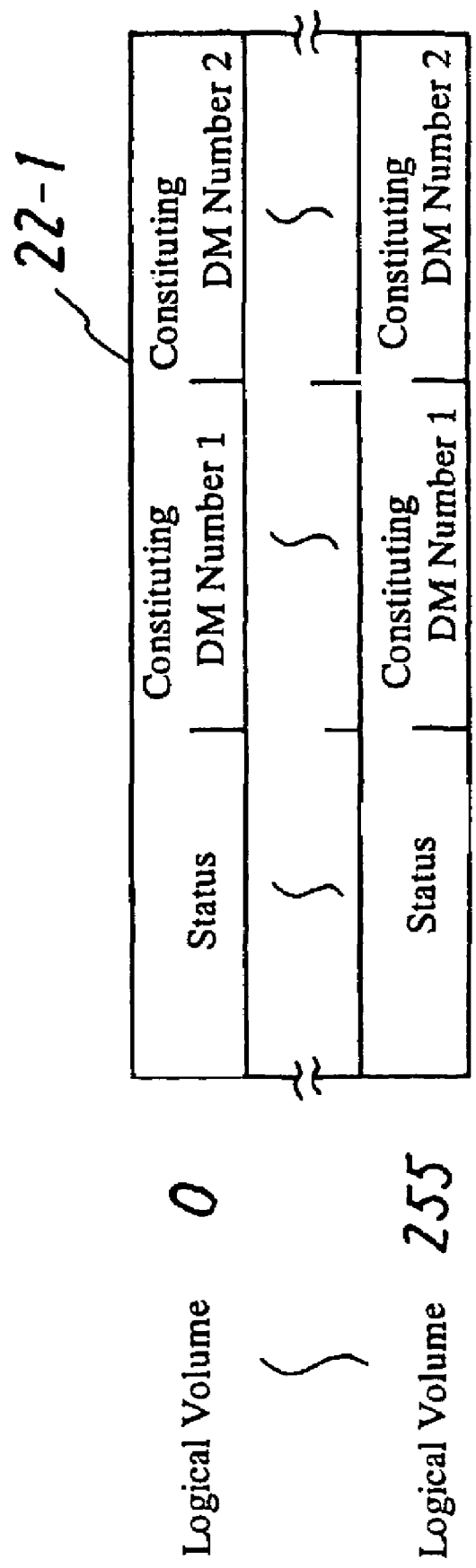
FIG. 3 is an explanatory diagram of a logical volume structure table according to the embodiment in FIG. 2.

FIG. 2 is a structural diagram of one embodiment of this invention, FIG. 3 is an explanatory diagram of a logical volume structure table according to the embodiment in FIG. 2, and FIG. 4 is an explanatory diagram of a DM management table according to the embodiment in FIG. 2.

Referring to FIG. 2, the disk controller 10 is constituted of a magnetic disk controller. The disk controller 10 has a channel adapter 20, a resource manager 21, a table storage 22, a main storage 23 and device adapters 24-0 to 24-3.

The channel adapter 20 exchanges commands/data with a high-rank apparatus like a host computer. The resource manager 21 performs control to manage resources. The resource manager 21 is constituted of a microprocessor.

The table storage 22 stores various sorts of tables for the control operation. The table storage 22 stores a logical volume structure table 22-1, which will be discussed later with reference to FIG. 3 and a DM management table 22-2 which will be discussed later with reference to FIG. 4.

The main storage 23 serves to store read/write data, etc. The device adapters 24-0 to 24-3 control access to the devices (magnetic disk units) 11-0 to 11-3 in accordance with a request from the resource manager 21.

The magnetic disk units 11-0 and 11-2 and so forth are connected to the device adapter 24-0. The magnetic disk units 11-1 and 11-3 and so forth are connected to the device adapter 24-1.

The magnetic disk units 11-0 and 11-2 and so forth are also connected to the device adapter 24-2, which is a spare circuit for the device adapter 24-0. Likewise, the magnetic disk units 11-1 and 11-3 and so forth are also connected to the device adapter 24-3, which is a spare circuit for the device adapter 24-1.

The magnetic disk units 11-0 to 11-3 are each constituted of a well-known magnetic disk storage device. The magnetic disk unit 11-0 forms the logical volume LM0. The magnetic disk unit 11-1 also forms the logical volume LM0. The magnetic disk unit 11-2 forms the logical volume LM1. The magnetic disk unit 11-3 also forms the logical volume LM1.

This structure is a RAID-1 mirror structure in which the individual logical volumes LM0 and LM1 are doubled. That is, two identical volumes are provided for each logical volume.

When receiving an access request from the high-rank apparatus, the channel adapter 20 issues a device access request to the resource manager 21. Upon reception of the device access request, the resource manager 21 determines a device access path and requests the associated device adapter of performing the operation.

The device adapter queues an operation for each magnetic disk unit, and accesses the magnetic disk units in the queued order.

When starting access to a magnetic disk unit, the device adapter issues a data transfer request to the resource manager 21. The resource manager 21 assigns an area in the main storage 23 and permits the device adapter to execute data transfer. As a result, the device adapter transfers data from the magnetic disk unit to the main storage 23.

When informed of the end of data transfer by the device adapter, the resource manager 21 permits the channel adapter 20 to perform a data access. Consequently, the channel adapter 20 transfers data in the main storage 23 to the high-rank apparatus in a read process. In a write process, the channel adapter 20 writes write data from the high-rank apparatus over data in the main storage 23.

When the channel adapter 20 completes data transfer, the resource manager 21 releases the area in the main storage 23 in the read process. In the write process, the resource manager 21 writes the data in the main storage back to the associated magnetic disk unit, and then frees the main storage 23.

This writing is accomplished by staging data in the memory 21. In the mirror structure, write-back is performed on a pair of magnetic disk units which hold the same logical volume.

As shown in FIG. 3, the logical volume structure table 22-1 in the table storage 22 stores the statuses and the constituting DM numbers of the individual logical volumes "0" to "255." The status includes structure definition information and mirroring information for each logical volume. The mirroring information consists of two bits indicating whether each of a pair of magnetic disk units which has a mirror structure is normal or abnormal. The two constituting DM numbers 1 and 2 indicate the number of a pair of magnetic disk units which has a mirror structure.

As shown in FIG. 4, the DM management table 22-2 of the table storage 22 stores the statues, the numbers of loads and the connected DA numbers of the individual magnetic disk units "0" to "255". The status includes degrade information indicating whether each magnetic disk unit is normal or abnormal and information indicating whether each of a pair of device adapters to which each magnetic disk unit is connected is normal or abnormal.

The number of loads indicates the number of operations that are requested to each magnetic disk unit. That is, the number of loads indicates the number of operations of each magnetic disk unit which are currently being performed and are standing by for execution. The two connected DA numbers 1 and 2 indicate the numbers of a pair of device adapters to which each magnetic disk unit is connected.

Figure 5:
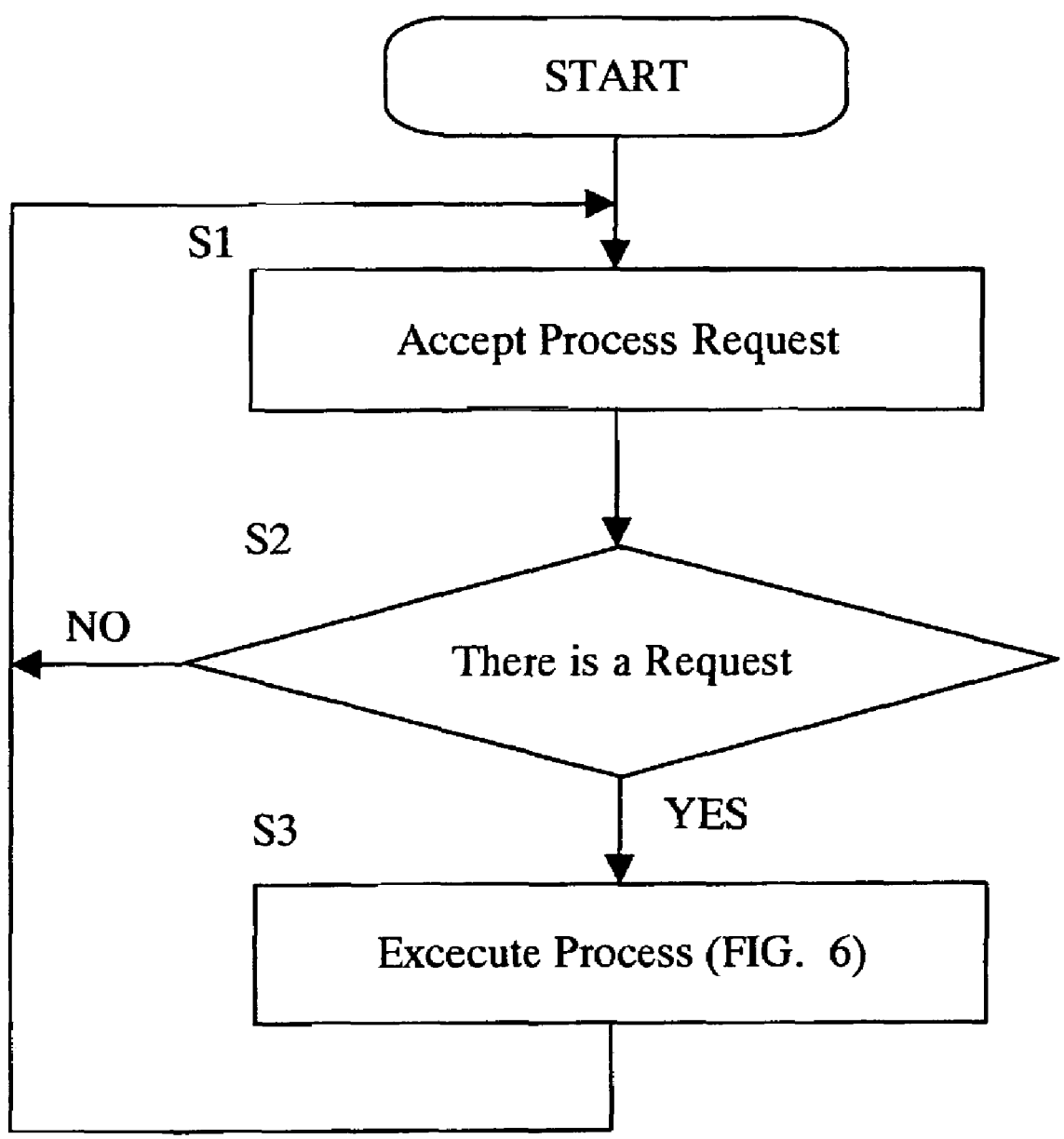
FIG. 5 is a flowchart for an idling process according to the embodiment in FIG. 2.
Figure 6:
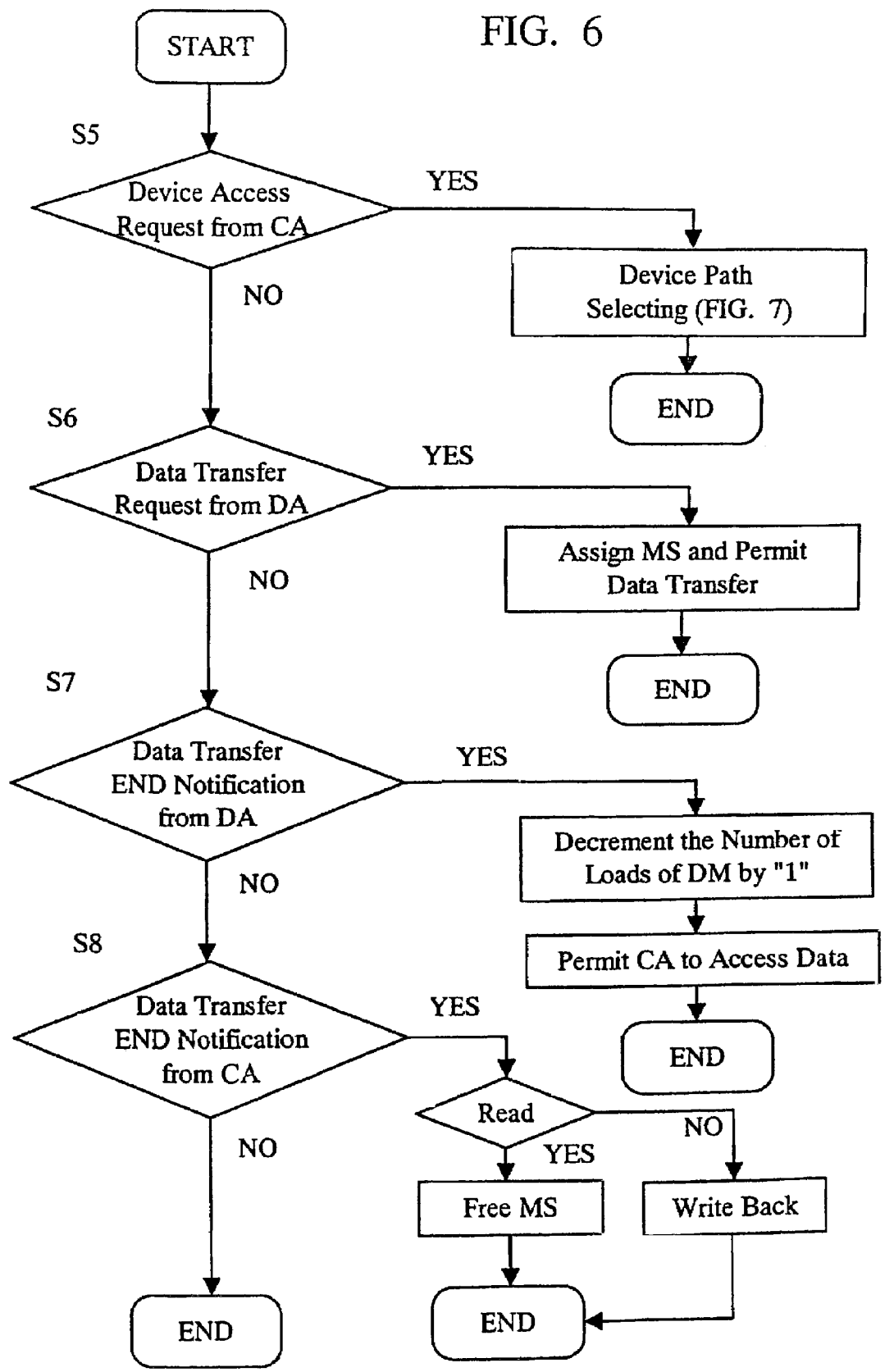
FIG. 6 is a flowchart for a request executing process according to the embodiment in FIG. 5.
Figure 7:
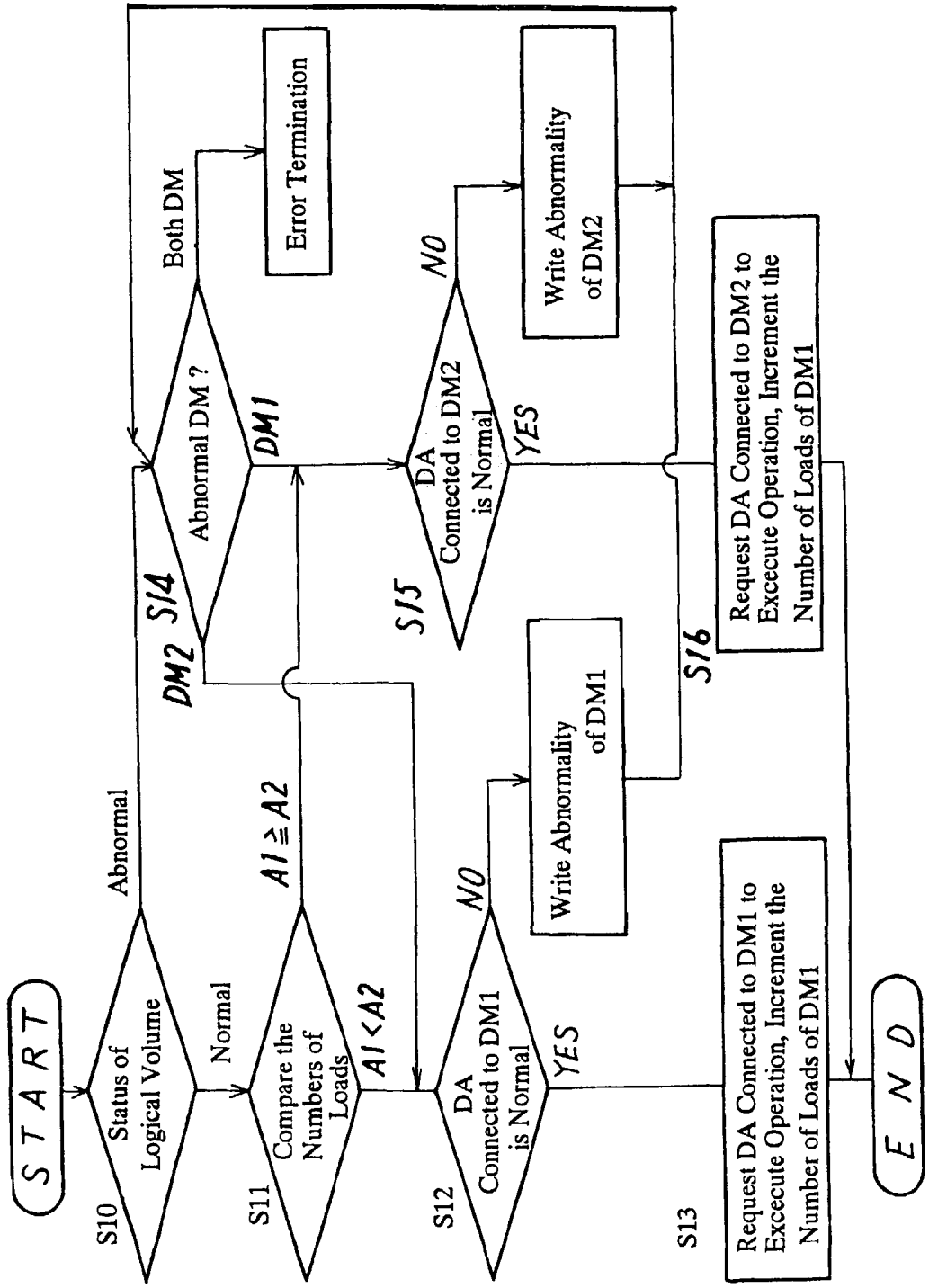
FIG. 7 is a flowchart for a device path selecting process according to the embodiment in FIG. 6.
Figure 8:
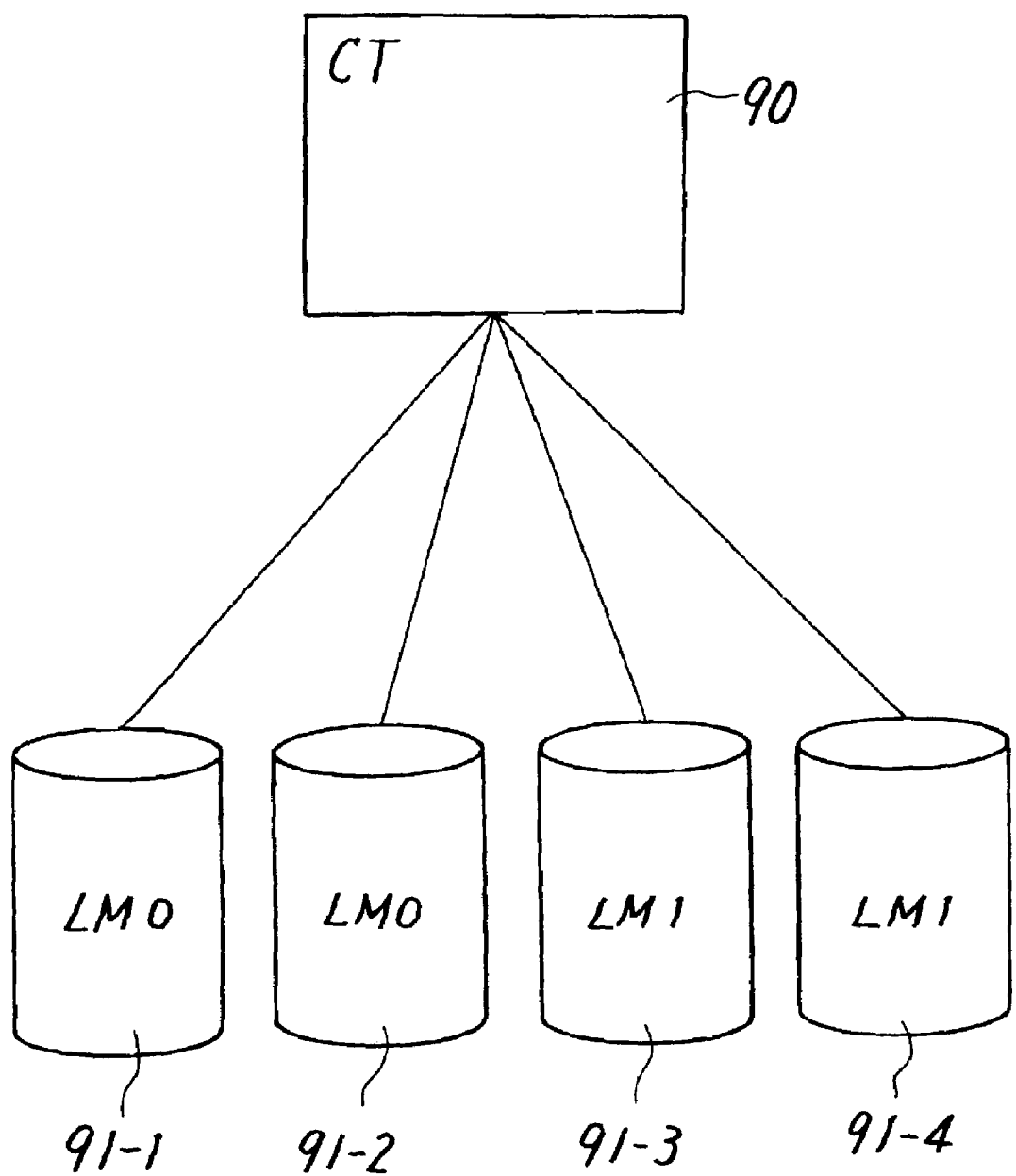
FIG. 8 is an explanatory diagram of prior art.

FIG. 5 is a flowchart for an idling process according to the embodiment in FIG. 2, FIG. 6 is a flowchart for a request executing process according to the embodiment in FIG. 5, and FIG. 7 is a flowchart for a device path selecting process according to the embodiment in FIG. 6.

FIGS. 5 through 7 illustrate processes which are executed by the resource manager 21 in FIG. 2. The idling process in FIG. 5 will be discussed first.

(S1) The resource manager (hereinafter called "processor") 21 accepts process requests from the channel adapter 20 and device adapters 24-0 to 24-3.

(S2) When there is no process request, the processor 21 returns to step S1.

(S3) When there is a process request, the processor 21 performs the request executing process shown in FIG. 6, and then returns to step S1.

The request executing process in FIG. 6 will now be described.

(S5) The processor 21 checks if the process request is a device access request from the channel adapter (CA) 20. When determining that the process request is a device access request from the channel adapter (CA) 20, the processor 21 terminates the routine after executing a device path selecting process shown in FIG. 7.

Upon reception of an access request from a high-rank apparatus, the channel adapter (CA) 20 sends out a device access request to the processor 21.

(S6) When determining that the process request is not a device access request from the channel adapter (CA) 20, the processor 21 determines if the process request is a data transfer request from any one of the device adapters (DA) 24-0 to 24-3.

When determining that the process request is a data transfer request from the device adapter (DA) 24-0, 24-1, 24-2 or 24-3, the processor 21 assigns an area in the main storage (MS) 23 and then permits the requesting device adapter (DA) to carry out data transfer. Then, the processor 21 terminates the routine.

The device adapter (DA) queues operation requests from the processor 21, and accesses the magnetic disk units in the queued order. After the access, the device adapter (DA) generates a data transfer request.

(S7) When determining that the process request is not a data transfer request from any of the device adapters (DA) 24-0 to 24-3, the processor 21 determines if the process request is data transfer end notification from any of the device adapters (DA) 24-0 to 24-3.

When determining that the process request is data transfer end notification from any of the device adapters (DA) 24-0 to 24-3, the processor 21 determines from the end notification which magnetic disk unit (DM) has completed data transfer, and decreases the number of loads of that magnetic disk unit in the DM management table 22-2 by "1."

Then, the processor 21 permits the channel adapter (CA) 20 to make a data access after which the processor 21 terminates the routine. If it is a read process, the channel adapter 20 transfers data in the main storage 23 to the high-rank apparatus. If it is a write process, the channel adapter 20 writes write data from the high-rank apparatus over the data in the main storage 23.

After executing the operation and completes data transfer from the target magnetic disk unit to the main storage (MS) 23, the device adapter (DA) generates data transfer end notification and goes to a process for the next operation.

(S8) When determining that the process request is not data transfer end notification from any of the device adapters (DA) 24-0 to 24-3, the processor 21 determines if it is data transfer end notification from the channel adapter (CA).

When determining that the process request is data transfer end notification from the channel adapter (CA), the processor frees an area in the main storage 23 and then terminates the routine, if it is a read process.

If it is a write process, not a read process, the write-back process is performed. Specifically, after a pair of magnetic disk units constituting a mirror structure are selected, data in the main storage 23 is transferred to the pair of magnetic disk units after which the routine is terminated.

The device path selecting process in FIG. 6 will now be discussed with reference to the process flow in FIG. 7.

When receiving an access request from the channel adapter 20, the processor 21 selects a device path and requests the associated device adapter to execute an operation in that device path.

(S10) First, the processor 21 refers to the logical volume structure table 22-1 in the table storage 22. The processor checks the status information of a designated logical volume. Based on mirroring information in the status information, the processor 21 then checks whether each of the pair of magnetic disk units which form the mirror structure is normal or abnormal.

When the mirroring information indicates an abnormal event, the processor 21 proceeds to step S14. When the mirroring information indicates a normal event, the processor 21 proceeds to step S11.

(S11) When the mirroring information indicates a normal event, each of the pair of magnetic disk units which form the mirror structure is normal. Therefore, the processor 21 acquires a pair of magnetic disk unit numbers (DM1, DM2) which hold the designated logical volume in the logical volume structure table 22-1.

Then, the processor 21 reads the numbers of loads A1 and A2 of the pair of magnetic disk units from the DM management table 22-2. The processor 21 then compares the numbers of loads A1 and A2 of the pair of magnetic disk units with each other.

When the number of loads A1 of one of the magnetic disk units is equal to or greater than the number of loads A2 of the other magnetic disk unit, it indicates that the load on the former magnetic disk unit is heavier. The processor 21 therefore moves to step S15 to select the latter magnetic disk unit with a lighter load.

When the number of loads A1 of one magnetic disk unit is smaller than the number of loads A2 of the other one, it indicates that the load on the former magnetic disk unit is lighter. The processor 21 thus proceeds to step S12 to select the former magnetic disk unit with a lighter load.

(S12) The processor 21 refers to the status information of the selected magnetic disk unit (DM1) in the DM management table 22-2. This status information indicates the statuses of the device adapters to which that magnetic disk unit (DM1) is connected.

When the processor 21 determines from the status information that a pair of device adapters to which the selected magnetic disk unit (DM1) is connected are both abnormal, the processor 21 cannot access the selected magnetic disk unit (DM1). Accordingly, the processor 21 writes data indicative of the abnormality of the selected magnetic disk unit (DM1) into the mirroring information in the status information in the logical volume structure table 22-1. Then, the processor 21 proceeds to step S14.

(S13) When the processor 21 determines from the status information that both or one of the pair of device adapters to which the selected magnetic disk unit (DM1) is connected is normal, the processor 21 can access the selected magnetic disk unit (DM1). Accordingly, the processor 21 requests the device adapter which is connected to the selected magnetic disk unit (DM1) to perform the operation of the selected magnetic disk unit.

The processor 21 adds "1" to the number of loads A1 of that magnetic disk unit number in the DM management table 22-2, and then terminates the routine.

(S14) The processor 21 determines from the mirroring information in the logical volume structure table 22-1 which magnetic disk unit is abnormal. When determining that the other magnetic disk unit (DM2) alone is abnormal, the processor 21 proceeds to step S12.

When determining that one magnetic disk unit (DM1) is abnormal, the processor 21 proceeds to step S15 to select the other magnetic disk unit (DM2).

The processor 21 determines from the mirroring information in the logical volume structure table 22-1 which magnetic disk unit is abnormal. When determining that both magnetic disk units (DM1, DM2) are abnormal, the processor 21 makes an error termination.

(S15) The processor 21 refers to the status information of the selected magnetic disk unit (DM2) in the DM management table 22-2. This status information indicates the statuses of the device adapters to which that magnetic disk unit (DM2) is connected.

When the processor 21 determines from the status information that a pair of device adapters to which the selected magnetic disk unit (DM2) is connected are both abnormal, the processor 21 cannot access the selected magnetic disk unit (DM2). Accordingly, the processor 21 writes data indicative of the abnormality of the selected magnetic disk unit (DM2) into the mirroring information in the status information in the logical volume structure table 22-1. The processor 21 then proceeds to step S14.

(S16) When the processor 21 determines from the status information that both or one of the pair of device adapters to which the selected magnetic disk unit (DM2) is connected is normal, the processor 21 can access the selected magnetic disk unit (DM2). Accordingly, the processor 21 requests the device adapter which is connected to the selected magnetic disk unit (DM2) to perform the operation of the selected magnetic disk unit.

Then, the processor 21 adds "1" to the number of loads A2 of that magnetic disk unit number in the DM management table 22-2, and terminates the routine.

The number of loads (the number of operations) of each magnetic disk unit is stored in the DM management table 22-2 in this manner. This number is incremented for each operation request and decremented for each transfer end (access completion), so that the number of operations (the number of loads) of each magnetic disk unit which are standing by for execution and are currently being processed can always be grasped.

The processor (resource manager) refers to this number of operations at the time of selecting a device path. The processor selects that of a pair of magnetic disk units with a mirror structure which has a smaller number of operations. This scheme makes the numbers of loads of a pair of magnetic disk units even, thus improving the access speed.

By contrast, magnetic disk units may be selected alternately every given time. However, access requests from a high-rank apparatus do not come evenly. What is more, single-access times are not even. Therefore, this scheme has a difficulty in performing access control in such a manner that the numbers of loads on a plurality of magnetic disk units which hold the same logical volume become even.

Likewise, magnetic disk units may be selected alternately for each access request. Since single-access times are not even, therefore, it is not possible to execute access control in such a way that the numbers of loads on a pair of magnetic disk units become even.

According to this invention, by contrast, the number of loads of each magnetic disk unit is monitored directly, making it possible to carry out access control in such a way that the numbers of loads on a pair of magnetic disk units become even.

Conventionally, the device adapter manages the statuses of magnetic disk units. The resource manager would know an abnormality in the selected magnetic disk unit from a response from the associated device adapter which has been made after the resource manager asked the device adapter to perform an operation. When the selected magnetic disk unit is abnormal, therefore, the prior art requires that the selection and the operation should be performed again.

With regard to this point, in this embodiment, the status information indicating the statuses of a pair of magnetic disk units is stored in the logical volume structure table for each logical volume. When the resource manager selects the magnetic disk unit which is associated with a designated logical volume, the resource manager refers to this status information to find out an abnormal magnetic disk unit.

It is therefore possible to prevent a damaged magnetic disk unit from being selected. That is, when one magnetic disk unit in the mirror structure fails, the other magnetic disk unit can automatically be selected regardless of the number of loads.

Further, according to this embodiment, the status information indicating the statuses of device adapters to which each selected magnetic disk unit is connected, in the DM management table. When the resource manager selects the magnetic disk unit which is associated with a designated logical volume, the resource manager refers to this status information to find out an abnormal device adapter.

It is thus possible to prevent an operation request from being made to a failed device adapter. As regards the status of the DM management table, when the resource manager makes an operation request, any failed device adapter informs an error, which makes it possible to update the status of the DM management table.

Besides the above-described embodiment, this invention may be modified as follows.

(1) Although the foregoing description has been given of the RAID-1 or the mirror structure which has double logical volumes, this invention may be adapted to the structure which has logical volumes provided in triple or more.

(2) Although the physical disk units have been explained as magnetic disk units, optical disk units, magneto-optical disk units or the like may be used as well.

Although one specific embodiment of this invention has been described herein, various other modifications can be made within the scope and spirit of this invention, and the present examples and embodiment are to be considered as illustrative and not restrictive.

As presented above, this invention has the following advantages.

(1) Because the number of operations of each physical disk unit is monitored and a physical disk unit with a smaller number of operations is selected, it is possible to make the number of loads on a plurality of physical disk units which hold each logical volume even.

(2) Since unbalanced load distribution can be prevented, the access speed can be improved.

(3) As the number of operations of each physical disk unit is monitored, unbalanced load distribution can be prevented accurately irrespective of the operation speed of the physical disk units.

What is claimed is:

1. A RAID apparatus comprising:
    a plurality of physical disk units storing a plurality of copies of each of logical volumes; and
    a disk controller accessing any of the physical disk units which stores a designated logical volume to thereby access said designated logical volume,
    said disk controller including:
        a plurality of device adapters for accessing said physical disk units in accordance with a request, said plurality of device adapters connected to each physical disk unit;
        a memory storing a logical volume structure table storing statuses of the logical volumes and indicating said physical disk units of each logical volume, and a disk management table storing a number of operations of each physical disk unit and statuses of said connected device adapters, for each physical disk unit; and
        control means for referring to said statuses of the logical volumes in said logical volume structure table for the designated logical volume and judging whether a status of said designated logical volume indicates abnormal, comparing with each other the numbers of operations stored in said disk management table that correspond to the plurality of physical disk units which store said designated logical volume when said designated logical volume status is judged normal, selecting a single minimum waiting physical disk unit on which said designated logical volume is allocated according to the comparison of the numbers of operations in said disk management table, judging whether said device adapter connected to said selected single minimum waiting physical disk is normal from referring to said statuses of said connected device adapters in said disk management table, and outputting a request to said judged normal device adapter.

2. An access control method for a RAID apparatus comprising a plurality of physical disk units storing a plurality of copies of each of logical volumes, and a plurality of device adapters connected to each physical disk unit to access the physical disk units, said method comprising:
    storing a logical volume structure table storing statuses of the logical volumes and indicating said physical disk units of each logical volume, and a disk management table storing a number of operations of each physical disk unit and statuses of said connected device adapters, for each physical disk unit;
    determining a plurality of physical disk units which store a designated logical volume to access any of the determined physical disk units which stores the designated logical volume via a connected device adapter;
    judging whether a status of said designated logical volume indicates abnormal by referring to the statuses of logical volumes in the logical volume structure table;
    comparing with each other the numbers of operations stored in the disk management table that correspond to the plurality of physical disk units which store said designated logical volume when said designated logical volume status is judged normal;
    selecting a single minimum waiting physical disk unit on which said designated logical volume is allocated according to the comparison of the numbers of operations in said disk management table;
    judging whether said device adapter connected to said selected single minimum waiting physical disk is normal from referring to said statuses of said connected device adapters in said disk management table; and
    outputting a request to said judged normal device adapter.

* * * * *